(12) United States Patent
Bennett

(10) Patent No.: US 7,486,060 B1
(45) Date of Patent: Feb. 3, 2009

(54) SWITCHING VOLTAGE REGULATOR COMPRISING A CYCLE COMPARATOR FOR DYNAMIC VOLTAGE SCALING

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 308 days.

(21) Appl. No.: 11/393,425

(22) Filed: Mar. 30, 2006

(51) Int. Cl.
G05F 1/40 (2006.01)
G05F 1/56 (2006.01)

(52) U.S. Cl. ................................. 323/282; 323/271

(58) Field of Classification Search ............... 323/222, 323/223, 225, 268, 271, 282, 285, 288
See application file for complete search history.

(56) References Cited

U.S. PATENT DOCUMENTS

| | | | |
|---|---|---|---|
| 4,164,648 A | 8/1979 | Chu | |
| 4,675,617 A | 6/1987 | Martin | |
| 4,737,670 A | 4/1988 | Chan | |
| 4,822,144 A | 4/1989 | Vriens | |
| 4,922,141 A | 5/1990 | Lofgren et al. | |
| 5,146,121 A | 9/1992 | Searles et al. | |
| 5,386,187 A * | 1/1995 | Bichler et al. | 323/222 |
| 5,440,250 A | 8/1995 | Albert | |
| 5,440,520 A | 8/1995 | Schutz et al. | |
| 5,479,119 A | 12/1995 | Tice et al. | |
| 5,612,610 A | 3/1997 | Borghi et al. | |
| 5,629,610 A | 5/1997 | Pedrazzini et al. | |
| 5,638,019 A | 6/1997 | Frankeny | |
| 5,640,383 A | 6/1997 | Kamoto et al. | |
| 5,661,422 A | 8/1997 | Tice et al. | |
| 5,717,683 A | 2/1998 | Yoshimoto et al. | |
| 5,747,976 A | 5/1998 | Wong et al. | |
| 5,748,050 A | 5/1998 | Anderson | |
| 5,777,567 A | 7/1998 | Murata et al. | |
| 5,787,292 A | 7/1998 | Ottesen et al. | |
| 5,808,455 A | 9/1998 | Schwartz et al. | |
| 5,994,885 A | 11/1999 | Wilcox et al. | |
| 6,031,426 A | 2/2000 | Yechuri | |
| 6,055,287 A | 4/2000 | McEwan | |
| 6,125,157 A | 9/2000 | Donnelly et al. | |

(Continued)

FOREIGN PATENT DOCUMENTS

WO    WO 90/13079    11/1990

OTHER PUBLICATIONS

Thomas D. Burd, et al., "A dynamic Voltage Scaled Microprocessor System", IEEE Journal of Solid-State Circuits, vol. 35, No. 11, pp. 1571-1580, Nov. 2000.

(Continued)

Primary Examiner—Matthew V Nguyen
(74) Attorney, Agent, or Firm—Howard H. Sheerin, Esq.

(57) ABSTRACT

A switching voltage regulator is disclosed for regulating a voltage supplied to system circuitry. The switching voltage regulator comprises an oscillator operable to generate an oscillator signal representing a gate speed of a reference circuit in the system circuitry, and a frequency generator operable to generate a reference signal representing a target gate speed of the reference circuit. A cycle comparator compares at least one cycle of the oscillator signal to at least one cycle of the reference signal, and switching circuitry charges a charging element based at least on part on the comparison.

20 Claims, 4 Drawing Sheets

U.S. PATENT DOCUMENTS

| | | | |
|---|---|---|---|
| 6,157,247 | A | 12/2000 | Abdesselem et al. |
| 6,188,206 | B1 | 2/2001 | Nguyen et al. |
| 6,259,293 | B1 | 7/2001 | Hayase et al. |
| 6,259,327 | B1 | 7/2001 | Balistreri et al. |
| 6,285,263 | B1 | 9/2001 | Anderson |
| 6,288,524 | B1 * | 9/2001 | Tsujimoto .................. 323/285 |
| 6,333,652 | B1 | 12/2001 | Iida et al. |
| 6,356,062 | B1 | 3/2002 | Elmhurst et al. |
| 6,396,251 | B2 | 5/2002 | Corva et al. |
| 6,424,184 | B1 | 7/2002 | Yamamoto et al. |
| 6,425,086 | B1 | 7/2002 | Clark et al. |
| 6,449,110 | B1 | 9/2002 | DeGroat et al. |
| 6,449,575 | B2 | 9/2002 | Bausch et al. |
| 6,515,460 | B1 | 2/2003 | Farrenkopf |
| 6,525,585 | B1 | 2/2003 | Iida et al. |
| 6,535,735 | B2 | 3/2003 | Underbrink et al. |
| 6,577,535 | B2 | 6/2003 | Pasternak |
| 6,617,936 | B2 | 9/2003 | Dally et al. |
| 6,622,252 | B1 | 9/2003 | Klaassen et al. |
| 6,657,467 | B2 | 12/2003 | Seki et al. |
| 6,693,473 | B2 | 2/2004 | Alexander et al. |
| 6,774,694 | B1 | 8/2004 | Stern et al. |
| 6,831,494 | B1 | 12/2004 | Fu et al. |
| 6,868,503 | B1 | 3/2005 | Maksimovic et al. |
| 6,870,410 | B1 | 3/2005 | Doyle et al. |
| 6,885,210 | B1 | 4/2005 | Suzuki |
| 6,909,266 | B2 | 6/2005 | Kernahan et al. |
| 6,987,380 | B1 | 1/2006 | Lee |
| 7,015,735 | B2 | 3/2006 | Kimura et al. |
| 7,042,202 | B2 | 5/2006 | Sutardja et al. |
| 7,061,292 | B2 | 6/2006 | Maksimovic et al. |
| 7,102,446 | B1 | 9/2006 | Lee et al. |
| 7,109,695 | B2 | 9/2006 | King |
| 7,129,763 | B1 | 10/2006 | Bennett et al. |
| 7,176,663 | B2 * | 2/2007 | Takimoto et al. ............ 323/224 |
| 7,205,805 | B1 | 4/2007 | Bennett |
| 7,259,603 | B2 * | 8/2007 | Gibson et al. ............... 327/170 |
| 7,330,017 | B2 * | 2/2008 | Dwarakanath et al. ...... 323/282 |
| 7,330,019 | B1 | 2/2008 | Bennett |
| 2003/0093160 | A1 | 5/2003 | Maksimovic et al. |
| 2004/0257056 | A1 | 12/2004 | Huang et al. |
| 2005/0099235 | A1 | 5/2005 | Sakamoto |
| 2005/0134391 | A1 | 6/2005 | Kimura et al. |
| 2005/0140418 | A1 | 6/2005 | Muniandy et al. |
| 2005/0218871 | A1 | 10/2005 | Kang et al. |
| 2005/0218877 | A1 | 10/2005 | Oswald et al. |
| 2005/0251700 | A1 | 11/2005 | Henderson |
| 2006/0129852 | A1 | 6/2006 | Bonola et al. |
| 2006/0161678 | A1 | 7/2006 | Bopardikar et al. |
| 2006/0227861 | A1 | 10/2006 | Maksimovic et al. |

OTHER PUBLICATIONS

Gu-Yeon Wei et al., "A Fully Digital, Energy-Efficient, Adaptive Power-Supply Regulator", IEEE Journal of Solid-State Circuits, vol. 34, No. 4, pp. 520-528, Apr. 1999.

Anthony John Stratakos, "High-Efficiency Low-Voltage DC-DC Conversion for Portable Applications", Ph.D. Dissertation, University of California, Berkley, pp. 1, 124-129, 177-183, 188-191, Dec. 1998.

Aleksandar Prodic, et al., "Mixed-Signal Simulation of Digitally Controlled Switching Converters," IEEE COMPEL, pp. 100-105, Jun. 2002.

Jinwen Xiao, et al., "A 4-µA Quiescent-Current Dual-Mode Digitally Controlled Buck Converter IC for Cellular Phone Applications," IEEE Journal of Solid-State Circuits, vol. 39, No. 12, pp. 2342-2348, Dec. 2004.

Shamim Choudhury, "Designing a TMS320F280x Based Digitally Controlled DC-DC Switching Power Supply," Texas Instruments Application Report, http://focus.ti.com, spraab3.pdf, pp. 1-16, Jul. 2005.

"Applications for White LED Driver in Parallel vs. Series," Analog Integrations Corporation (AIC), AIC1845, AN027.pdf, www.analog. com, pp. 1-7, Oct. 2003.

"Power Supply Regulation," printout from Altera website, http://www.altera.com/support/devices/power/regulators/pow-regulators.html. Oct. 2006.

Marc Fleischmann, "LongRun Power Management, Dynamic Power Management for Crusoe Processors", Transmeta Corporation, pp. 1-18, Jan. 17, 2001.

Alexander Klaiber, "The Technology Behind Crusoe Processors, Low-Power X86-Compatible Processors Implemented With Code Morphing Software", Transmeta Corporation, pp. 1-18, Jan. 2000.

* cited by examiner

SWITCHING VOLTAGE REGULATOR COMPRISING A CYCLE COMPARATOR FOR DYNAMIC VOLTAGE SCALING

BACKGROUND OF THE INVENTION

1. Field of the Invention

The present invention relates to switching voltage regulators. More particularly, the present invention relates to a switching voltage regulator comprising a cycle comparator for dynamic voltage scaling.

2. Description of the Prior Art

Prior art switching voltage regulators (such as discontinuous buck voltage regulators) may implement dynamic voltage scaling in order to optimize power consumption by using critical path gate speed as the feedback for switching control. Various techniques have been disclosed for measuring the critical path gate speed, including the incorporation of a ring oscillator that generates an oscillator signal with a frequency proportional to the gate speed of the critical path circuit (where the gate speed is inversely proportional to the propagation delay of the critical path circuit). The error between the oscillator frequency and a reference frequency represents the gate speed error used as feedback for switching control. In a discontinuous buck mode voltage regulator, an inductor charge cycle is triggered when the oscillator frequency falls below the reference frequency. Dynamic voltage scaling may be employed in any suitable application, for example, to optimize power consumption of a microprocessor that is configured to operate at different speeds depending on software dynamics, load dynamics, etc.

The frequency error is typically generated by computing the average of the oscillator frequency (e.g., using a counter), which introduces transport delay and quantization error into the feedback loop requiring appropriate compensation filtering (e.g., PID filtering). The compensation filtering typically reduces the bandwidth of the feedback loop which can lead to poor transient response. In systems where the gate speed of the critical path circuitry must not fall below an operating threshold, a margin is typically added (to the reference frequency) to compensate for a slow transient response of the voltage regulator. This added margin can lead to unnecessary power dissipation, which is of particular concern in portable applications. It is also desirable to minimize the ripple voltage of a switching voltage regulator in order to reduce power consumption while maintaining adequate transient response.

There is, therefore, a need to improve the transient response of a switching voltage regulator employing dynamic voltage scaling to reduce power consumption.

SUMMARY OF THE INVENTION

An embodiment of the present invention comprises a switching voltage regulator for regulating a voltage supplied to system circuitry. The switching voltage regulator comprises an oscillator operable to generate an oscillator signal representing a gate speed of a reference circuit in the system circuitry, and a frequency generator operable to generate a reference signal representing a target gate speed of the reference circuit. A cycle comparator compares at least one cycle of the oscillator signal to at least one cycle of the reference signal, and switching circuitry charges a charging element based at least in part on the comparison.

In one embodiment, the oscillator comprises a ring oscillator.

In another embodiment, the cycle comparator comprises control circuitry operable to synchronize the oscillator and the frequency generator.

In yet another embodiment, the cycle comparator comprises a first register clocked by the oscillator signal, wherein the first register asserts a first signal at the end of the oscillator cycle, and a second register clocked by the reference signal, wherein the second register asserts a second signal at the end of the reference cycle. In one embodiment, the first register comprises a first counter and the second register comprises a second counter. In one embodiment, the first counter is loaded with a first value, and the second counter is loaded with a second value different than the first value. In another embodiment, the cycle comparator further comprises a latch operable to latch one of the first and second signals. In one embodiment, the cycle comparator comprises a first latch for latching the first signal, and a second latch for latching the second signal.

In yet another embodiment, the cycle comparator further comprises tie circuitry operable to detect when the at least one cycle of the oscillator signal substantially matches the at least one cycle of the reference signal.

In still another embodiment, the switching voltage regulator further comprises a first charging counter operable to time a charge time of the charging element and a second charging counter operable to time a delay period following the charge time. In one embodiment, the switching voltage regulator further comprises control circuitry operable to adjust at least one of the first and second charging counters in response to the comparison.

Another embodiment of the present invention comprises a method of operating a switching voltage regulator for regulating a voltage supplied to system circuitry. An oscillator signal is generated representing a gate speed of a reference circuit in the system circuitry, and a reference signal is generated representing a target gate speed of the reference circuit. At least one cycle of the oscillator signal is compared to at least one cycle of the reference signal, and a charging element is charged based at least in part on the comparison.

DESCRIPTION OF THE PREFERRED EMBODIMENTS

Figure 1:
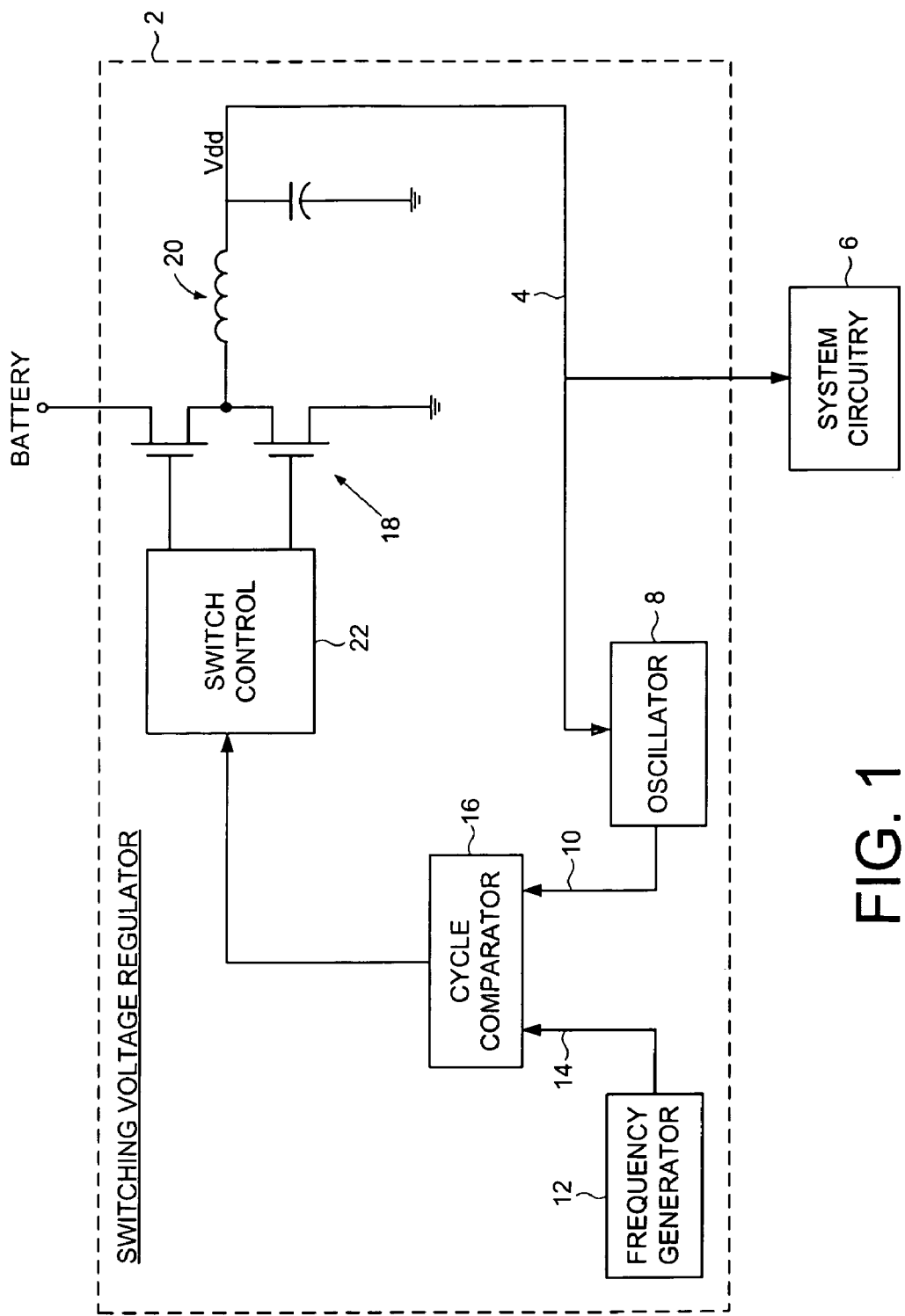
FIG. 1 shows a switching voltage regulator according to an embodiment of the present invention comprising a cycle comparator for comparing at least one cycle of an oscillator signal to at least one cycle of a reference signal, and for controlling switching circuitry in response to the comparison.

FIG. 1 shows a switching voltage regulator 2 according to an embodiment of the present invention for regulating a voltage 4 supplied to system circuitry 6. The switching voltage regulator 2 comprises an oscillator 8 operable to generate an oscillator signal 10 representing a gate speed of a reference circuit in the system circuitry 6, and a frequency generator 12 operable to generate a reference signal 14 representing a target gate speed of the reference circuit. A cycle comparator 16 compares at least one cycle of the oscillator signal 10 to at least one cycle of the reference signal 14, and switching circuitry 18 charges a charging element based at least in part on the comparison.

Any suitable charging element (e.g., an inductor, a capacitor, etc.) may be employed in embodiments of the present invention with any suitable switching voltage regulator configuration. In the embodiment of FIG. 1, a buck mode voltage regulator is shown employing an inductor 20 as the charging element. In other embodiments, the switching voltage regulator may include a boost mode voltage regulator, or a buck/boost mode voltage regulator. Also in the embodiment of FIG. 1, the switching voltage regulator 2 comprises switch control 22, which may comprise any suitable circuitry, such as a microprocessor executing instructions of a control program, or any suitable state machine circuitry, an example of which is described below with reference to FIG. 4.

Of course, as would be well understood by those skilled in the art, the physical location of the elements comprising the switching voltage regulator is unimportant. For example, in certain embodiments, the oscillator 8 may be located on a separate chip with the system circuitry 6. In other embodiments, the inductor 20 may be located separately from digital circuitry comprising portions of the switching voltage regulator. Furthermore, the system circuitry 6 may comprise any circuitry supplied by a voltage. In one embodiment, the system circuitry 6 may comprise a microprocessor, as would be typically found in a computer. In another embodiment, the system circuitry 6 may comprise analog circuitry configured to perform one or more tasks.

Figure 2:
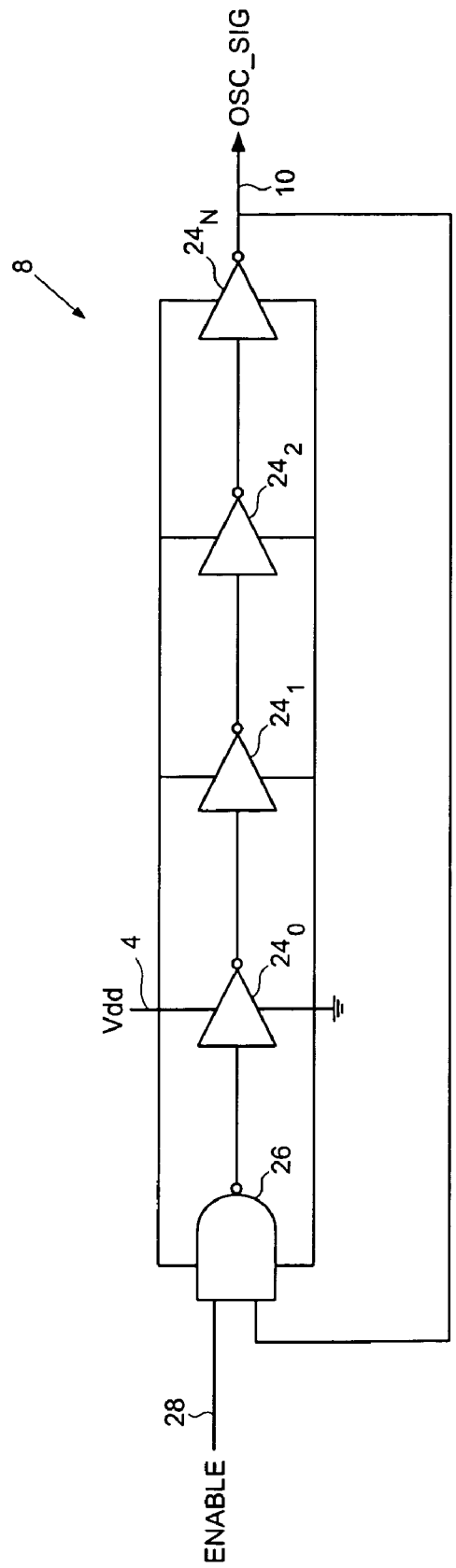
FIG. 2 shows an oscillator according to an embodiment of the present invention for generating the oscillator signal representing a gate speed of a reference circuit in the system circuitry.

Any suitable frequency generator 12 and oscillator 8 may be used in the embodiments of the present invention. In one embodiment, the frequency generator 12 comprises a programmable frequency synthesizer, and the oscillator 8 comprises a ring oscillator, an example of which is shown in FIG. 2. The ring oscillator 8 of FIG. 2 comprises a plurality of inverters $24_0$-$24_N$ connected in a ring configuration and an AND gate 26 for enabling the ring oscillator 8 in response to an enable signal 28. The number of inverters $24_0$-$24_N$ is preferably selected such that the oscillator signal 10 output by the ring oscillator 8 will oscillate at a frequency representing a gate speed of a reference circuit in the system circuitry 6. Typically, the reference circuit that the ring oscillator 8 tracks will be a critical path circuit within the system circuitry 6. In one embodiment, the ring oscillator 8 is configurable to represent one of a plurality of different circuits (or circuit paths) within the system circuitry 6 depending on a mode of operation (i.e., the reference circuit may be different circuits at different times). Moreover, the oscillator frequency need not correspond precisely with the gate speed of the reference circuit, but may instead simply track it (e.g., the oscillator frequency may be a multiple of the corresponding gate speed-equivalent frequency of the reference circuit). In a preferred embodiment, the oscillator frequency is directly proportional to the gate speed of the reference circuit. The oscillator frequency will vary relative to the magnitude of the supply voltage 4 as well as external factors, such as temperature. Therefore, adjusting the magnitude of the supply voltage 4 adjusts the frequency of the oscillator signal 10 until the reference circuit is operating at the desired gate speed.

The simulation and layout software used in the design of the system circuitry 6 may provide sophisticated timing analysis of various delays. In one embodiment, the reference circuit within the system circuitry 6 is determined at design time using the simulation and layout software. The gates of the ring oscillator 8 and system circuitry 6 may be fabricated together so they have similar characteristics. Some differences may occur due to loading effects and wire routing; however, by adding inverters, lengthening wires through physical placement, adding dummy loads, and placing the ring oscillator 8 as close as possible to the reference circuit, the ring oscillator 8 may be configured to substantially match the delay of the reference circuit. The ring oscillator 8 will change speed as the temperature changes, as the supply voltage 4 changes, or as the manufacturing process produces faster or slower gates, and thereby track the propagation delay of the reference circuit within the system circuitry 6.

Figure 3:
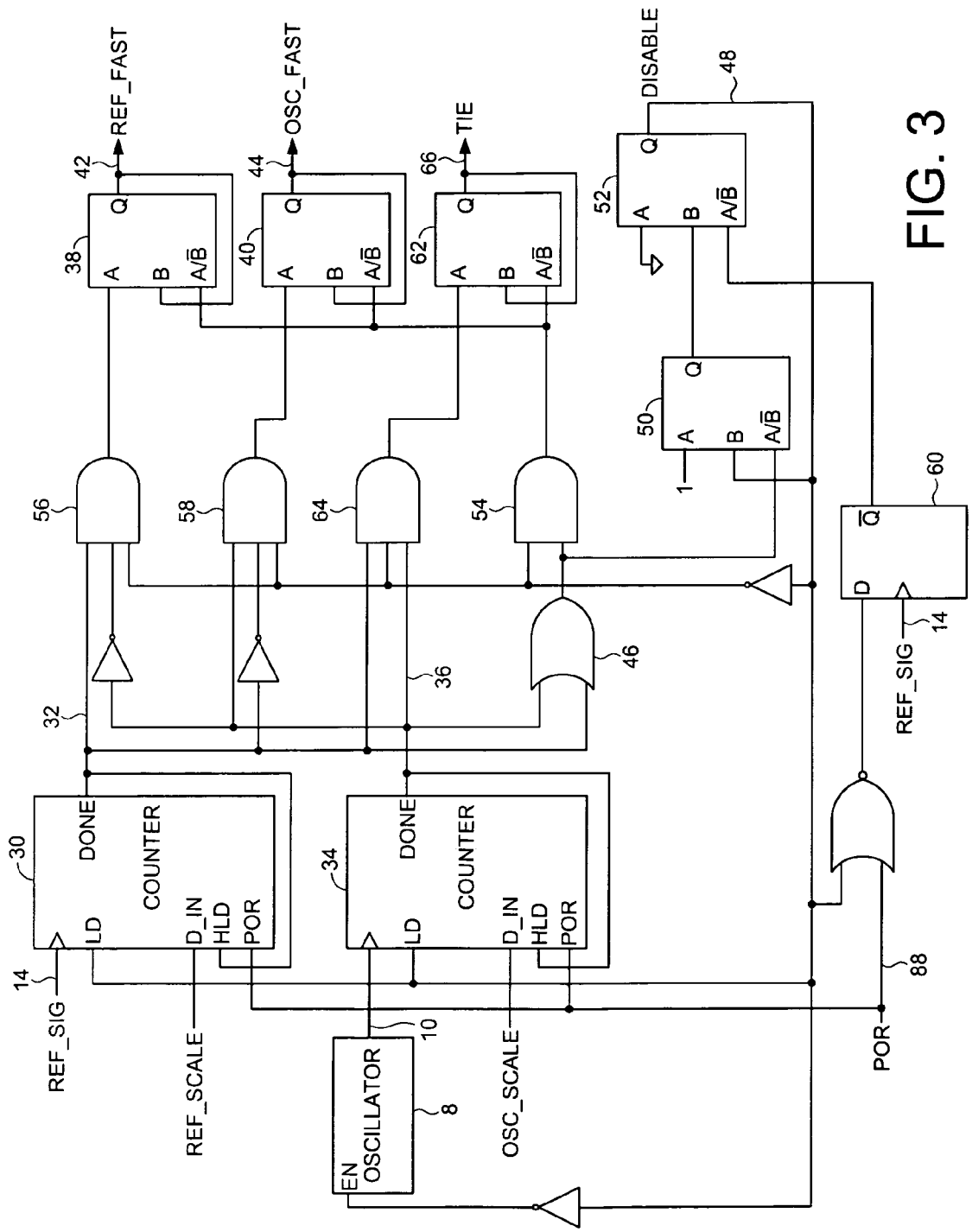
FIG. 3 shows a cycle comparator according to an embodiment of the present invention comprising a first register (counter) clocked by the reference signal and a second register (counter) clocked by the oscillator signal, wherein the first register to output a pulse is latched by a respective latch circuit.

FIG. 3 shows an example embodiment of a cycle comparator 16 for comparing at least one cycle of the oscillator signal 10 to at least one cycle of the reference signal 14. The cycle comparator 16 comprises a first register 30 (e.g., a first counter) clocked by the reference signal 14, wherein the first register 30 asserts a first signal 32 at the end of the reference cycle, and a second register 34 (e.g., a second counter) clocked by the oscillator signal 10, wherein the second register 34 asserts a second signal 36 at the end of the oscillator cycle. The cycle comparator 16 further comprises a latch 38 for latching the first signal 32 if generated before the second signal 36, and a latch 40 for latching the second signal 36 if generated before the first signal 32. Latch 38 thus outputs a reference fast (REF_FAST) signal 42 indicating when the reference signal 14 is oscillating faster than the oscillator signal 10, and latch 40 outputs an oscillator fast (OSC_FAST) signal 44 when the oscillator signal 10 is oscillating faster than the reference signal 14.

When either the first or second signals 32 or 36 is triggered and latches 38 or 40 have captured whichever signal arrived first, an OR gate 46 asserts a disable signal 48 through latches 50 and 52. The disable signal 48 latches the outputs of latches 38 and 40 through AND gate 54, and disables the latches 38 and 40 through AND gates 56 and 58 until the next sample period. The disable signal 48 also disables the oscillator 8 and loads the counters 30 and 34 with appropriate starting values. A register 60 resets the disable signal 48 when clocked by the reference signal 14 to thereby synchronize the oscillator 8 and the frequency generator 12. Of course, in other embodiments, the control circuitry herein shown for synchronizing the oscillator 8 and the frequency generator 12 may be replaced with different circuitry configurations, as would be well understood by those skilled in the art.

In one embodiment, the cycle comparator 16 compares one cycle of the oscillator signal 10 to one cycle of the reference signal 14. Because the cycle comparator 16 compares a cycle (or cycles) of the oscillator signal 10 to a cycle (or cycles) of the reference signal 14, as compared to computing a frequency difference using counters, the cycle comparator 16 may in some embodiments reduce the transport delay and quantization error, and thereby improve the transient response of the switching voltage regulator 2.

The counters 30 and 34 in the embodiment of FIG. 3 enable scaling of the oscillator frequency or the reference frequency. For example, if the frequency of the oscillator signal 10 should equal half the frequency of the reference signal 14, then counter 30 is loaded with a starting value that is twice the starting value loaded into counter 34, from which values the two counters count down at each cycle of the reference and oscillator signals. In another embodiment, the cycle comparator 16 compares multiple cycles of the oscillator signal 10 and reference signal 14 in order to improve the accuracy of the measurement, for example, by compensating for startup transient errors of the ring oscillator 8. For example, in one embodiment, counters 30 and 34 are loaded with a starting value of 2 in order to compare two cycles of the oscillator signal 10 to two cycles of the reference signal 14.

Depending on the speed requirements and circuit tolerances, a number of the components shown in FIG. 3 may be modified or eliminated while still performing the same cycle comparison function. In one embodiment, the counters 30 and 34 are implemented using simple registers for detecting a single cycle of the reference signal 14 and oscillator signal 10, respectively.

In yet another embodiment, the cycle comparator 16 comprises tie circuitry for preventing ambiguities in the comparison when the at least one cycle of the oscillator signal 10 substantially matches the at least one cycle of the reference signal 14. In one embodiment, the substantial match may be determined based on circuit characteristics of the tie circuitry, and may equal some percentage of the oscillator or reference cycles. Example tie circuitry is shown in FIG. 3 as comprising a latch 62 for latching the near simultaneous occurrence of both pulse signals 32 and 36 (through AND gate 64) and outputting a TEE signal 66.

Figure 4:
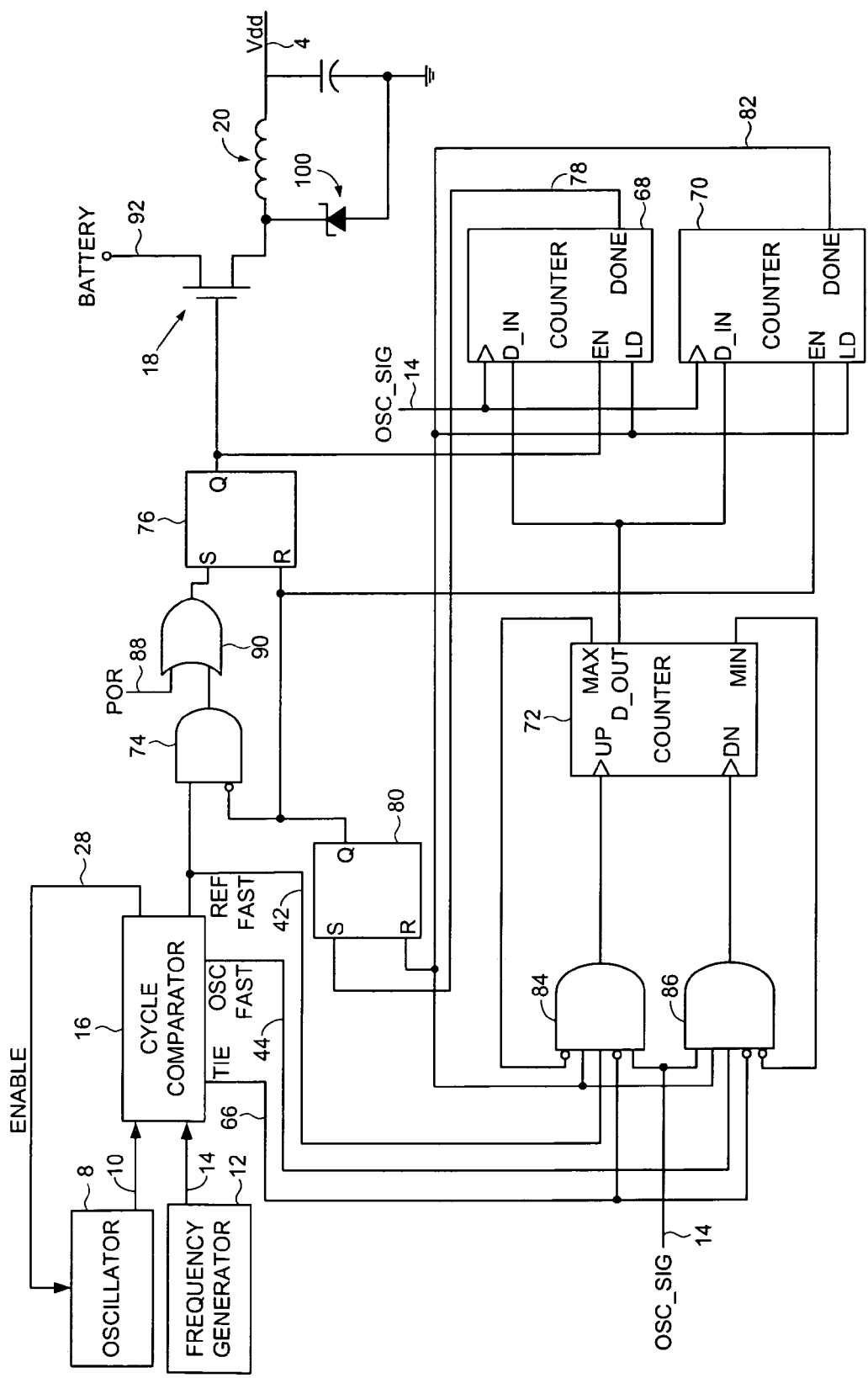
FIG. 4 shows a switching voltage regulator according to an embodiment of the present invention wherein the output of the cycle comparator enables a first charging counter for timing a charge time, and a second charging counter for timing a delay period after the charge time.

FIG. 4 shows a switching voltage regulator employing a cycle comparator 16 according to an embodiment of the present invention. A first charging counter 68 times a charge time of the charging element 20, and a second charging counter 70 times a delay period following the charge time. The first and second charging counters 68 and 70 are loaded initially with a nominal value generated by a third counter 72. When the REF_FAST signal 42 is active (indicating that the output voltage 4 is too low), it enables AND gate 74 and sets register 76, thereby turning on switch 18 so as to charge the charging element 20. When the first charging counter 68 reaches a terminal count, it generates a DONE signal 78 that sets register 80 to disable AND gate 74 and reset register 76 in order to turn off the switch 18. Register 80 also enables the second charging counter 70 to begin counting.

When the second charging counter 70 reaches a terminal count, it generates a DONE signal 82 that resets register 80 to enable AND gate 74 and thereby enable the next charging cycle. The DONE signal 82 also enables AND gates 84 and 86 in order to "sample" the REF_FAST signal 42 and OSC_FAST signal 44 to make appropriate adjustments to the charging time. If the REF_FAST signal 42 is high after the delay period established by the second charging counter 70, it means that the charging time should be increased. Therefore AND gate 84 increments the third counter 72 so as to increment the charge time of the first charging counter 68 and the delay period of the second charging counter 70. If the OSC_FAST signal 44 is high after the delay period established by the second charging counter 70, it means the charging time should be decreased. Therefore, AND gate 86 decrements the third counter 72 so as to decrement the charge time of the first charging counter 68 and the delay period of the second charging counter 70. If the TIE signal 66 is high at the end of the delay period indicating the at least one cycle of the oscillator signal 10 substantially matches the at least one cycle of the reference signal 14, the TIE signal 66 disables AND gates 84 and 86 so that the third counter 72 remains the same.

The switching voltage regulator of FIG. 4 comprises a diode 100 that enables a recirculation current. In an alternative embodiment, the diode 100 of FIG. 4 is replaced with a conventional switch (e.g., a FET, as shown in FIG. 1) to improve efficiency by avoiding the voltage drop of the diode 100. In one embodiment, a current detector is employed to turn off the switch (and enable the next charge cycle) once the current decays to zero.

In one embodiment, the switching voltage regulator comprises suitable circuitry to facilitate a startup operation during a power-on restart (POR) event. For example, in the embodiment of FIG. 4, a POR signal 88 enables the charge cycle through OR gate 90 regardless of the discharge level of the current in order to help maintain a sufficient output voltage 4 during the startup operation. Once the switching voltage regulator stabilizes, the POR signal 88 is disabled so that the regulator enters the discontinuous mode. In another embodiment, a separate oscillator driven by the input voltage (battery 92) may generate the oscillator signal for clocking the first and second charging counters 68 and 70 of FIG. 4. This helps ensure that the charging counters 68 and 70 operate reliably during the startup operation since this separate oscillator is driven by the input voltage rather than by the output voltage 4.

In yet another embodiment, during the startup operation, the delay period generated by the second charging counter 70 may be increased in order to reduce the maximum current flowing through the switch 18 at the beginning of each charge cycle, thereby providing a current limit function to help protect the switch 18. The delay period generated by the second charging counter 70 may be increased in any suitable manner, for example, by loading the second charging counter 70 with a larger value, or by adjusting the clock speed of the second charging counter 70 while POR 88 is active.

I claim:

1. A switching voltage regulator for regulating a voltage supplied to system circuitry, the switching voltage regulator comprising:
   (a) an oscillator operable to generate an oscillator signal representing a gate speed of a reference circuit in the system circuitry;
   (b) a frequency generator operable to generate a reference signal representing a target gate speed of the reference circuit;
   (c) a cycle comparator operable to compare at least one cycle of the oscillator signal to at least one cycle of the reference signal; and
   (d) switching circuitry operable to charge a charging element based at least in part on the comparison.

2. The switching voltage regulator as recited in claim 1, wherein the oscillator comprises a ring oscillator.

3. The switching voltage regulator as recited in claim 1, wherein the cycle comparator comprises control circuitry operable to synchronize the oscillator and the frequency generator.

4. The switching voltage regulator as recited in claim 1, wherein the cycle comparator comprises:
   (a) a first register clocked by the oscillator signal, wherein the first register asserts a first signal at the end of the oscillator cycle; and
   (b) a second register clocked by the reference signal, wherein the second register asserts a second signal at the end of the reference cycle.

5. The switching voltage regulator as recited in claim 4, wherein:
   (a) the first register comprises a first counter; and
   (b) the second register comprises a second counter.

6. The switching voltage regulator as recited in claim 5, wherein:
   (a) the first counter is loaded with a first value; and
   (b) the second counter is loaded with a second value different than the first value.

7. The switching voltage regulator as recited in claim 4, wherein the cycle comparator further comprises a latch operable to latch one of the first and second signals.

8. The switching voltage regulator as recited in claim 4, wherein the cycle comparator further comprises:
 (a) a first latch for latching the first signal; and
 (b) a second latch for latching the second signal.

9. The switching voltage regulator as recited in claim 1, wherein the cycle comparator further comprises tie circuitry operable to detect when the at least one cycle of the oscillator signal substantially matches the at least one cycle of the reference signal.

10. The switching voltage regulator as recited in claim 1, further comprising a first charging counter operable to time a charge time of the charging element and a second charging counter operable to time a delay period following the charge time.

11. The switching voltage regulator as recited in claim 10, further comprising control circuitry operable to adjust at least one of the first and second charging counters in response to the comparison.

12. A method of operating a switching voltage regulator for regulating a voltage supplied to system circuitry, the method comprising:
 generating an oscillator signal representing a gate speed of a reference circuit in the system circuitry;
 generating a reference signal representing a target gate speed of the reference circuit;
 comparing at least one cycle of the oscillator signal to at least one cycle of the reference signal; and
 charging a charging element based at least in part on the comparison.

13. The method as recited in claim 12, wherein a ring oscillator is used to generate the oscillator signal.

14. The method as recited in claim 12, further comprising synchronizing the generating of the oscillation signal to the generating of the reference signal.

15. The method as recited in claim 12, further comprising:
 clocking a first register with the oscillator signal, wherein the first register asserts a first signal at the end of the oscillator cycle; and
 clocking a second register with the reference signal, wherein the second register asserts a second signal at the end of the reference cycle.

16. The method as recited in claim 15, wherein:
 the first register comprises a first counter; and
 the second register comprises a second counter.

17. The method as recited in claim 15, further comprising latching the first signal if generated before the second signal, and latching the second signal if generated before the first signal.

18. The method as recited in claim 12, further comprising detecting when the at least one cycle of the oscillator signal substantially matches the at least one cycle of the reference signal.

19. The method as recited in claim 12, further comprising timing a charge time of the charging element using a first charging counter, and timing a delay period following the charge time using a second charging counter.

20. The method as recited in claim 19, further comprising adjusting at least one of the first and second charging counters in response to the comparison.

* * * * *